(12) United States Patent
Sunnari

(10) Patent No.: US 11,487,112 B2
(45) Date of Patent: Nov. 1, 2022

(54) HEAD-UP DISPLAY

(71) Applicant: DISPELIX OY, Espoo (FI)

(72) Inventor: Antti Sunnari, Espoo (FI)

(73) Assignee: DISPELIX OY, Espoo (FI)

(*) Notice: Subject to any disclaimer, the term of this patent is extended or adjusted under 35 U.S.C. 154(b) by 261 days.

(21) Appl. No.: 16/767,059

(22) PCT Filed: Nov. 27, 2018

(86) PCT No.: PCT/FI2018/050858
§ 371 (c)(1),
(2) Date: May 26, 2020

(87) PCT Pub. No.: WO2019/106233
PCT Pub. Date: Jun. 6, 2019

(65) Prior Publication Data
US 2020/0371353 A1    Nov. 26, 2020

(30) Foreign Application Priority Data
Nov. 28, 2017 (FI) .................... 20170164

(51) Int. Cl.
*G02B 27/01* (2006.01)
*F21V 8/00* (2006.01)
*B60K 35/00* (2006.01)

(52) U.S. Cl.
CPC .......... *G02B 27/0101* (2013.01); *B60K 35/00* (2013.01); *G02B 6/0055* (2013.01);
(Continued)

(58) Field of Classification Search
CPC ............ G02B 27/0101; G02B 27/0025; G02B 27/0103; G02B 6/0055; G02B 6/0056;
(Continued)

(56) References Cited

U.S. PATENT DOCUMENTS 5,657,163 A   12/1997 Ning et al.
8,830,588 B1   9/2014 Brown
(Continued)

FOREIGN PATENT DOCUMENTS

EP     2733517 A1     5/2014
JP     2017203894 A   11/2017
(Continued)

OTHER PUBLICATIONS

Finnish Search Report dated Jun. 19, 2018 as received in application No. 20170164.
(Continued)

*Primary Examiner* — Brent D Castiaux
(74) *Attorney, Agent, or Firm* — Maschoff Brennan

(57) ABSTRACT

The invention relates to a head-up display device, a vehicle comprising such device and a method of forming an image in a head-up display device. The head-up display device is adapted to project an image on an image surface, such as a windshield. The device comprises a waveguide capable of guiding light carrying the image to be displayed, and an optical correction element. According to the invention, the waveguide is configured to couple light propagating therein towards the optical correction element, and the optical correction element is further configured to perform an optical function for said light and to direct the light towards the image surface through the waveguide.

15 Claims, 2 Drawing Sheets

(52) U.S. Cl.
CPC .... *G02B 6/0056* (2013.01); *B60K 2370/1529* (2019.05); *B60K 2370/28* (2019.05); *B60K 2370/336* (2019.05); *G02B 6/0038* (2013.01); *G02B 2027/011* (2013.01); *G02B 2027/0123* (2013.01)

(58) Field of Classification Search
CPC ...... G02B 6/0038; G02B 6/00; G02B 5/1814; G02B 2027/011; G02B 2027/0123; B60K 35/00; B60K 2370/1529; B60K 2370/28; B60K 2370/336; B60K 2370/334; B60Q 3/12

See application file for complete search history.

(56) References Cited

U.S. PATENT DOCUMENTS

| | | | |
|---|---|---|---|
| 2002/0186470 A1* | 12/2002 | Weissman | G02B 27/283 359/485.02 |
| 2005/0140644 A1 | 6/2005 | Mukawa | |
| 2009/0059380 A1 | 3/2009 | Moliton et al. | |
| 2014/0043689 A1 | 2/2014 | Mason | |
| 2016/0274356 A1* | 9/2016 | Mason | G02B 27/0081 |
| 2017/0205618 A1* | 7/2017 | Basset | G02B 6/00 |
| 2018/0074316 A1* | 3/2018 | Burkhardt | G02B 27/0103 |

FOREIGN PATENT DOCUMENTS

| | | | | |
|---|---|---|---|---|
| KR | 10-0820898 | | 4/2008 | |
| KR | 100820898 B1 | | 4/2008 | |
| KR | 20170008431 A1 | | 1/2017 | |
| WO | 2015/145119 | | 10/2015 | |
| WO | 2015/145119 A1 | | 10/2015 | |
| WO | 2016146697 A1 | | 9/2016 | |
| WO | WO-2016146697 A1 * | | 9/2016 | ............ G02B 26/10 |
| WO | 2017187514 A1 | | 2/2017 | |

OTHER PUBLICATIONS

European Search Report dated Jul. 23, 2021 as received in application No. 18883985.

Japanese Office Action dated Aug. 24, 2022 as received in application No. 2020-545889.

* cited by examiner

HEAD-UP DISPLAY

FIELD OF THE INVENTION

The invention relates to display technology. In particular, the invention relates to head-up displays (HUDs) and the like optical devices capable of presenting an image on at least partially transparent image surface.

BACKGROUND OF THE INVENTION

Head-up displays are used to present information (hereinafter images) e.g. for vehicle drivers at their natural sight, that is, typically on or in front of the windshield.

KR 100820898 B1, US 2014/043689 A1, WO 2015/145119 A1, US 2016/274356 A1 and U.S. Pat. No. 8,830,588 B1 discuss some known image projection techniques for head-up display and augmented reality displays.

First types of HUDs contain a separate image element, such as a diffrative waveguide, arranged more or less vertically between the user's eye and the windshield and the image is presented by coupling directly from the image element to the user's eye. This type has the drawback that the image element is visible for the user.

Second types of HUDs contain a direct image projector arranged below the windshield and capable of projecting the image to the windshield, from which the image is further reflected to the user's eye. Achieving a large field-of-view (FOV) in this HUD type requires relatively large projectors, which are difficult to fit in the instrument board of the vehicle.

Third types of HUDs comprise a more or less horizontally arranged waveguide which is itself hidden from the user's sight. The image is coupled to the waveguide using a suitable image source, and further out of the waveguide coupled to the user's eye via the windshield. These HUD suffer from the fact that windshields are typically curved, which produces a remarkable optical aberration to the image. Thus, even perfectly shaped images on the waveguide appear distorted for the user. Thus, there is a need for improved HUDs.

SUMMARY OF THE INVENTION

It is an aim of the invention to overcome at least some of the abovementioned problems. In particular, it is an aim to provide a HUD of the third type mentioned above, which allows for correction of windshield-induced image aberration.

An additional aim is to provide a HUD that allows for increasing the FOV and/or eyebox of the display.

In a first aspect, there is provided a head-up display device for projecting an image on an image surface. The device comprises a waveguide capable of guiding light carrying the image to be displayed, and an optical correction element. According to the invention, the waveguide is configured to couple light propagating therein towards the optical correction element, and the optical correction element is further configured to perform an optical function for said light and to direct the light towards the image surface through the waveguide.

According to a second aspect, there is provided a vehicle comprising a head-up display as herein described and a non-planar window element, in particular non-planar windshield, serving as the image surface of the display device. The optical correction element is configured to correct image distortions caused by the non-planar window element.

According to a third aspect, there is provided a method of forming an image in a head-up-display, the method comprising
coupling light carrying an image into a waveguide,
coupling light out of the waveguide towards an optical correction element arranged on a first main side thereof,
performing an optical function for the light at the optical correction element and
directing light from the optical correction element through the waveguide on an image surface on a second main side, opposite to the first main side, of the waveguide.

In particular, the invention is characterized by what is stated in the independent claims.

The invention offers significant benefits. First of all, it allows for the optical distortions of the image surface, such as a curved windshield, to be corrected. The whole image projection and correction can be achieved in a small space and without equipment that is visible for the user. The optical correction element can be located very close to the lightguide, whereby the device is thin.

The invention, namely the optical correction element also allows increase of FOV and/or eyebox, simultaneously to correcting the optical distortions and without additional optical parts.

Particular benefits are achieved using an embodiment where polarization-sensitive optical elements are used to prevent direct out-coupling of uncorrected light towards the image surface, while transforming the OCE-corrected light field such that is can pass to the image surface.

The dependent claims are directed to selected embodiments of the invention.

In some embodiments, the waveguide comprises two main surfaces, whereby the optical correction element is positioned to face the first main surface of the waveguide and the second main surface of the waveguide, opposite to the first main surface, is directed towards the image surface. This flat geometry allows for producing very thin display devices.

In some embodiments, there is provided a quarter-wave plate capable of altering the polarization of light and being arranged between the waveguide and the optical correction element so that said light passes twice through the quarter-wave plate. This allows for taking advantage of polarization of light so that effectively all of the light visits the optical correction element and none leaks directly to the image surface. Thus, ghost images and the like undesired effects are prevented.

In some embodiments, the device comprises a polarization filter, such as a polarization plate or wire grid, arranged between the waveguide and the image surface. The polarization filter ensures that no direct out-coupling of light takes place towards the iamge surface.

If polarization is taken advantage of, the in-coupling means which initially provide the light to the waveguide are adapted to produce polarized light or there is provided a polarizer in or on the waveguide itself. In any case, the polarization filter is configured to pass oppositely polarized light compared with the polarization direction of the light coupled out from the lightguide.

The optical correction element can be a mirror, such as a curved mirror, free-form mirror or fresnel mirror. However, other kinds of components such as prisms, or combinations of a plurality of optical elements, with an optical function can be used, too.

In some embodiments, the optical correction element is configured to perform an optical function that corrects image distortions caused by a curved image surface, as seen by the user. This means that at least part of the distortions, preferably essentially all of them, are removed. Thus, for example image shapes are maintained between the in-coupled image and displayed image.

The waveguide can be a diffractive waveguide, i.e., one where the out-coupling, and optionally in-coupling, is based on diffraction of light. However, there are also other options available. A diffractive grating may be a one-dimensionally periodic or doubly periodic grating.

Next, selected embodiments of the invention and advantages thereof are discussed in more details with reference to the attached drawings.

DETAILED DESCRIPTION OF EMBODIMENTS

Figure 1:
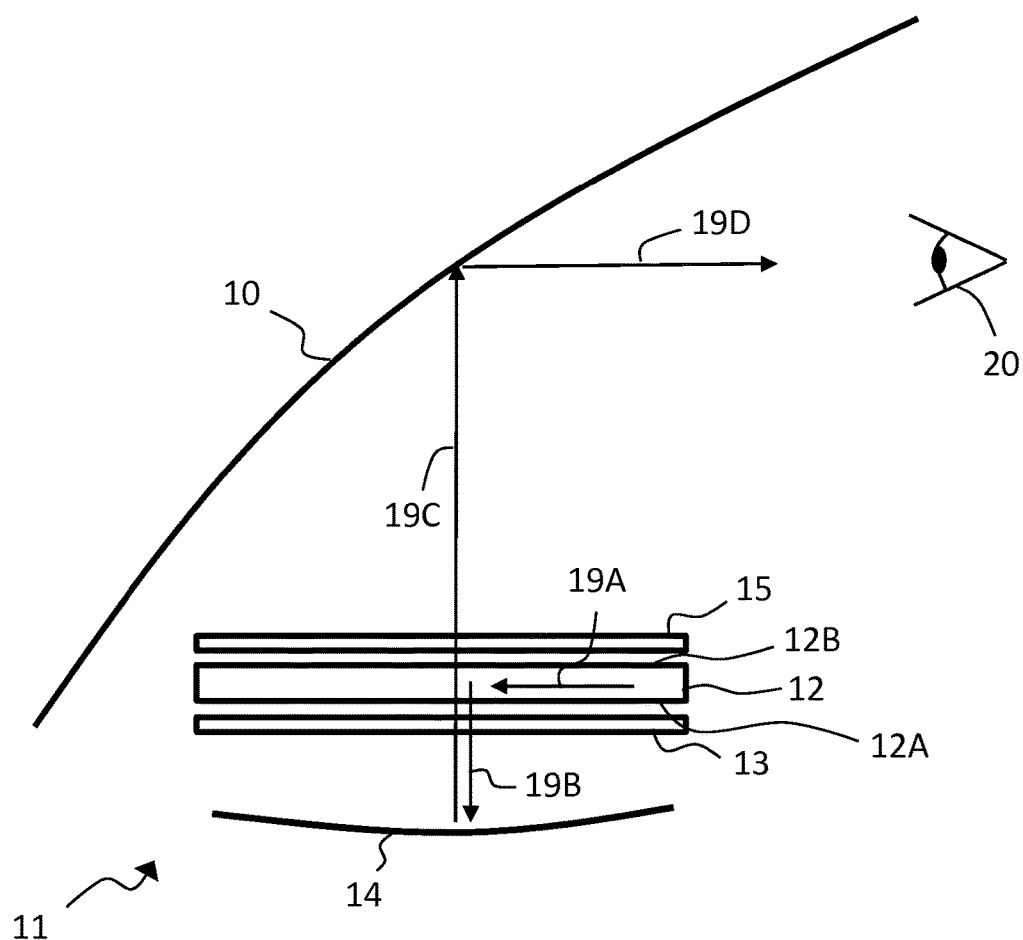
FIG. 1 shows a schematic illustration of the present head-up-display arrangement according to one embodiment.

In the arrangement of FIG. 1, there is provided a curved windshield 10 and a HUD device 11 arranged below the windshield 10. The HUD device 11 comprises a waveguide 12 having two main surfaces 12A, 12B. On the side of the first (lower) surface 12A, there is provided an optical correction element (OCE) 14, which in this case is a curved mirror.

The waveguide 12 is configured to guide light rays 19A laterally inside the waveguide via total internal reflections (TIRs), and to couple light rays 19B out towards the OCE 14. Out-coupling can be achieved e.g. using a diffractive grating (not shown) inside or on one or both surfaces thereof, but also other microstructure-based out-coupling means or other way are possible.

Likewise, light rays 19B can be coupled into the waveguide 12 using a diffractive in-coupling grating positioned therein or on a main surface thereof, or by other means, such as from the side of the waveguide.

In addition or instead of in- and/or out-coupling gratings, the waveguide and/or the image projection equipment associated therewith may comprise or be optically connected with other diffractive or non-diffractive optical elements, such as exit pupil expander elements, guide gratings, mirrors, prisms, filters, polarizers and/or lenses, which assist in shaping the light field or light properties before or inside the waveguide.

The OCE 14 is shaped and positioned with respect to the waveguide so that light rays 19B coupled out of the waveguide 12 are directed as reflected light rays 19B again towards the waveguide 12. The waveguide is configured to pass the reflected light rays 19B through and further towards the windshield 10.

The windshield 10, which is generally oblique with respect to the waveguide 12, further reflects light rays 19D towards the user's eye 20 inside the vehicle.

The optical function of the OCE 14 (e.g. shape of a conventional mirror), is matched with the optical function (shape) of the windshield so that the aberration caused by the windshield 10 is compensated for to at least some degree. In particular, the compensation may be such that essentially undistorted image is produced for the user.

In an advantageous embodiment, light polarization is taken advantage of for preventing direct out-coupling of light form the waveguide 12 to the windshield 10. As also illustrated in FIG. 1, there may be provided a polarization filter 15 on top (on the second surface 12B) of the waveguide 12 adapted to selectively pass polarized light, say Te-polarized light, for example. If the light 19A propagating inside the waveguide 12 is Tm-polarized, it will not pass the filter 15 directly.

The polarization filter 15 is herein parallel with the waveguide 12. It can be arranged on the second main surface 12B of the waveguide 12 or at a distance therefrom.

To ensure that the light 19C having visited the OCE 14 passes through to the windshield 10, there is provided a quarter-wave plate 13. In the presently shown geometry, light passes the quarter-wave plate 13 two times, first time when exiting the waveguide 12 to the OCE 14 and second time after the OCE and before passing the waveguide 12. Each time, alteration of polarization properties takes place, with the total effect of Tm-polarization being changed to Te-polarization, which can pass the filter 15.

The quarter-wave plate 13 is herein parallel with the waveguide 12. It can be arranged directly on the first main surface 12A of the waveguide 12 or at a distance therefrom.

Thus, the goals of preventing optically uncorrected light to pass to the windshield 10 and correction of the light field that passes to the windshield, are achieved simultaneously.

The polarization filter 15 can be any kind of polarization-sensitive filter. In one advantageous embodiment, a non-absorbing filter, such as a wire grid polarizer, is used. This maximizes the efficiency of the device, since effectively all rays are out-coupled to the OCE 14. Quarter-wave plates are also known per se.

The properties of the quarter-wave plate 13 and polarization filter 15 are chosen according to the wavelength and polarization properties of the light used in the display.

The desired effects can also be achieved using other kinds of polarization filter and wave plate arrangements than those described here in detail.

In some embodiments, the OCE 14 is configured to not only compensate for distortions caused by the image surface, but also to expand the field-of-view (FOV) of the display (compared with an OCE with identity function in the same geometry).

In some embodiments, the OCE 14 is configured to not only compensate for distortions caused by the image surface, and optionally to increase FOV, but also to expand the eye-box of the display (compared with an OCE with identity function in the same geometry).

The diameter of the lightguide used can be e.g. 100-450 mm.

Due to the possibility to extend the FOV and/or eye-box with the OCE, the diameter of the lightguide 12, can be decreased to e.g. 100-300 mm, for example 150-200 mm, still maintaining large image size and good user experience.

Figure 2:
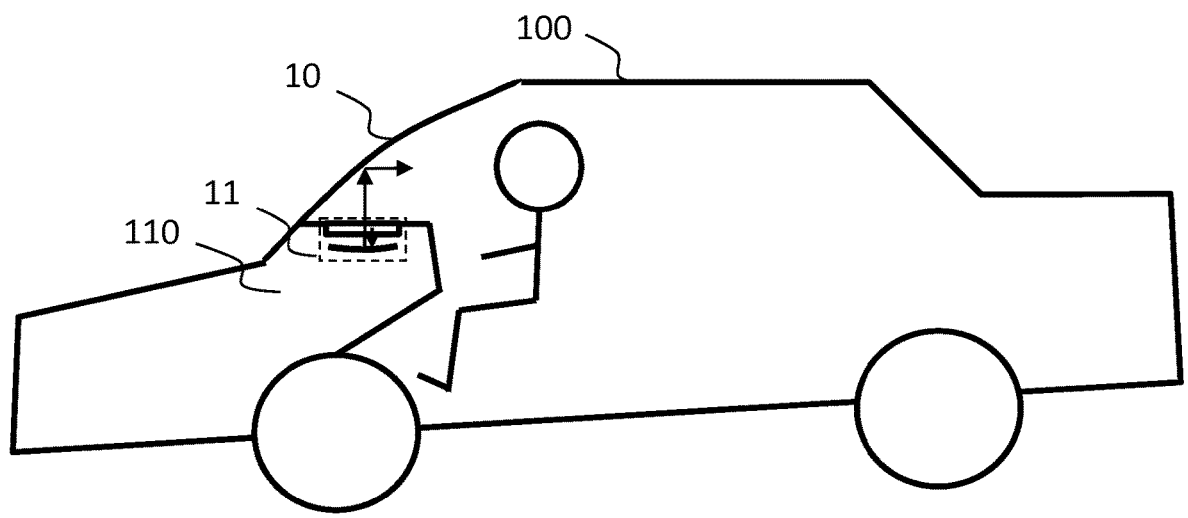
FIG. 2 shows a cross-sectional view of a car comprising a head-up display according to one embodiment.

FIG. 2 shows a car 100 comprising a windshield 10 and an instrument board 110. The display device is horizontally installed in the instrument board 110 so as to provide the image for the driver via the windshield 10.

Figure 3:
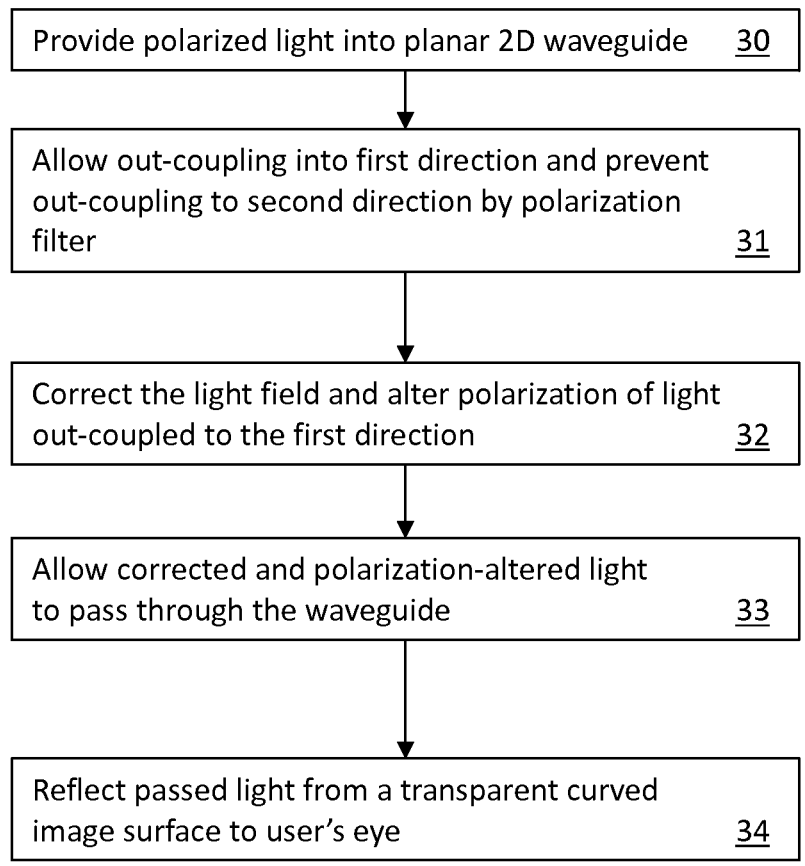
FIG. 3 shows a schematic flow chart of the present method according to one embodiment.

FIG. 3 illustrates one embodiment of the present method. In step 30, polarized light is provided into planar waveguide. In step 21, out-coupling into first direction is allowed and out-coupling to second direction is prevented using a polarization filter. In step 32, the light field and polarization of light out-coupled to the first direction is corrected/altered so as to compensate for distortions of the image surface and to "prepare" the light to pass the polarization filter. In step 33, the corrected and polarization-altered light is allowed to pass through the waveguide and the polarization filter thereon.

Finally, in step 34, light having passed the waveguide is reflected from a curved image surface to user's eye.

The various aspects and embodiments of the invention can be freely combined within the scope of the claims.

The invention claimed is:

1. A head-up display device for projecting an image on a curved image surface, the device comprising:
    a waveguide with two main surfaces that is configured to guide light laterally between the two main surfaces, the light carrying the image to be displayed, wherein the waveguide includes out-coupling structures configured to out-couple the light through a first main surface of the two main surfaces;
    an optical correction element positioned to receive the out-coupled light from the first main surface and reflect the out-coupled light back toward the first main surface;
    a quarter-wave plate parallel with the waveguide and positioned between the first main surface and the optical correction element so as to alter polarization of the out-coupled light and polarization of the reflected out-coupled light;
    a polarization filter parallel with a second main surface of the two main surfaces of the waveguide and positioned between the second main surface and the curved image surface,
    wherein:
        the optical correction element is configured to reflect the out-coupled light through the quarter-wave plate, through the waveguide, and through the polarization filter towards said image surface, and
        the optical correction element is configured to perform an optical function that corrects image distortions caused by the curved image surface.

2. The device according to claim 1, wherein:
    the optical correction element is positioned to face the first main surface of the waveguide, and
    the second main surface of the waveguide, opposite to the first main surface, is directed towards said image surface.

3. The device according to claim 2, wherein the quarter-wave plate is arranged on the first main surface of the waveguide or at a distance therefrom.

4. The device according to claim 1, wherein the polarization filter includes a polarization plate or wire grid.

5. The device according to claim 4, wherein the polarization filter is arranged on the second main surface of the waveguide or at a distance therefrom.

6. The device according to claim 1, further comprising means for coupling polarized light carrying said image to be displayed into the waveguide.

7. The device according to claim 4, wherein said polarization filter is configured to pass oppositely polarized light compared with the polarization direction of the out-coupled light.

8. The device according to claim 1, wherein the optical correction element is a mirror.

9. The device according to claim 1, wherein the optical correction element is further arranged to increase the field-of-view and/or eyebox of the head-up-display.

10. The device according to claim 1, wherein the waveguide is a diffractive waveguide.

11. A vehicle comprising:
    the head-up display device of claim 1, and
    a curved window element, in particular a curved windshield, serving as said image surface, wherein:
    the optical correction element is configured to correct image distortions caused by the curved window element.

12. A method of forming an image, the method comprising:
    providing the head-up display of claim 1;
    coupling light carrying an image into the waveguide:
    coupling light out of the waveguide to form the out-coupled light directed towards the optical correction element;
    performing said optical function for the light at the optical correction element; and
    directing the out-coupled light through the quarter-wave plate, through the waveguide, and through the polarization filter towards said image surface.

13. The method according to claim 12, wherein:
    the light coupled into the waveguide is polarized in a first polarization direction,
    out-coupling of light directly from the waveguide to the image surface is prevented by using the polarization filter having a second polarization direction opposite to the first polarization direction, and
    the polarization direction of the out-coupled light directed to the optical correction element is rotated to the second polarization direction so as to allow passing of optically corrected light to the image surface through said polarization filter.

14. The method according to claim 12, wherein the polarization direction of the out-coupled light directed to the optical correction element is altered in the quarter-wave plate before and after the optical correction element.

15. The device according to claim 8, wherein the mirror is a curved mirror, free-form mirror, or fresnel mirror.

* * * * *